(12) United States Patent
Formoso et al.

(10) Patent No.: US 12,196,245 B1
(45) Date of Patent: Jan. 14, 2025

(54) ANDROGYNOUS FASTENER

(71) Applicant: United States of America as Represented by the Administrator of NASA, Washington, DC (US)

(72) Inventors: Olivia Irene B. Formoso, Santa Clara, CA (US); Christine Elizabeth Gregg, San Mateo, CA (US); Greenfield Tran Trinh, San Jose, CA (US); Kenneth Chun-Wai Cheung, Portola Valley, CA (US); Arno Rogg, Santa Cruz, CA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 465 days.

(21) Appl. No.: 17/653,835

(22) Filed: Mar. 7, 2022

Related U.S. Application Data

(60) Provisional application No. 63/157,775, filed on Mar. 7, 2021.

(51) Int. Cl.
*F16B 21/04* (2006.01)
*F16B 37/08* (2006.01)

(52) U.S. Cl.
CPC .............. *F16B 37/08* (2013.01); *F16B 21/04* (2013.01); *F16B 37/085* (2013.01)

(58) Field of Classification Search
CPC ......... F16B 37/085; F16B 21/02; F16B 21/04
USPC .... 411/338, 339, 437, 349, 549, 551, 366.1, 411/426, 417–419
See application file for complete search history.

(56) References Cited

U.S. PATENT DOCUMENTS

| 404,429 | A | * | 6/1889 | Pearce | F16L 37/252 |
| | | | | | 285/99 |
| 5,197,404 | A | | 3/1993 | Haley et al. | |
| 5,247,549 | A | * | 9/1993 | Cearley | G21C 7/10 |
| | | | | | 411/339 |
| 7,722,374 | B2 | | 5/2010 | Hillis et al. | |

(Continued)

*Primary Examiner* — Flemming Saether
(74) *Attorney, Agent, or Firm* — Rhys W. Cheung; Robert Padilla; Trenton L. Roche

(57) ABSTRACT

An androgynous fastener for autonomous robotic assembly of high performance structures is disclosed herein. The androgynous fastener is lightweight and facilitates assembly through simple actuation with large driver-positioning tolerance requirements. The androgynous fastener provides a high-strength, reversible mechanical connection and may be used in high strength-to-weight ratio structural systems, such as lattice structure systems. The androgynous fastener resists tensile and shear forces upon loading of the lattice structure system thereby ensuring that the struts of the lattice structure system govern the mechanical behavior of the system. The androgynous fastener eliminates building-block orientation requirements and allows assembly in all orthogonal build directions. The androgynous fastener may be captive in building-block structural elements thereby minimizing the logistical complexity of transporting additional fasteners. Integration of a plurality of the androgynous fasteners into a high performance, robotically managed, structural system reduces launch energy requirements, enables higher mission adaptivity and decreases system life-cycle costs.

20 Claims, 12 Drawing Sheets

(56) References Cited

U.S. PATENT DOCUMENTS

| | | | |
|---|---|---|---|
| 8,858,144 B2* | 10/2014 | Van Cor | F16L 15/005 |
| | | | 411/416 |
| 9,562,553 B2* | 2/2017 | Burns | F16B 7/182 |
| 10,530,086 B2 | 1/2020 | Pittenger | |
| 2013/0142587 A1* | 6/2013 | Jardel | F16B 5/0642 |
| | | | 411/337 |

* cited by examiner

TABLE I

| Fastener Parameter | Value |
|---|---|
| Thread Angle | 30° |
| Number of Threads | 3 |
| Pitch | 1.9mm |
| Taper | 70° |
| External Diameter (DE) | 15.9 mm |
| Number of Teeth | 2 |
| Angle of Alignment Cone | 45° |
| Radial Fit (RF1) | 3.0 mm |
| Rotational Fit (RF2) | 50.4° |
| Draft Angle | 90° |
| Performance Metric | Value |
| Transverse Tolerance | 3.0 mm |
| Rotational Tolerance | 50.4° |
| Driver Azimuth Angle Tolerance | 16.3° |

FIG. 6

ANDROGYNOUS FASTENER

ORIGIN OF INVENTION

The invention described herein was made in the performance of work under a NASA contract and by (an) employee(s) of the United States Government and is subject to the provisions 51 U.S.C. § 20135 (b), Public Law 111-314, § 3 (124 Stat. 3330, 51 U.S.C. Chapter 201), and may be manufactured and used by or for the Government for governmental purposes without the payment of any royalties thereon or therefor.

TECHNICAL FIELD

The present invention generally relates to androgynous fasteners.

BACKGROUND AND DESCRIPTION OF RELATED ART

On-orbit assembly of structures allows for space missions that are reliant on large scale infrastructure. Such large scale infrastructure includes space stations, wide aperture transceivers and exoplanetary habitats. On-orbit fastening of modular structural components ranges in size and complexity from demonstration trusses to modules for the International Space Station (ISS). For these applications, assembly ConOps complexity and mission adaptivity benefits from the genderless or androgynous connectors or fasteners. The International Berthing and Docking Mechanism (IBDM) is an example of the ability to work with positional tolerances that are coupled to the capabilities of the Attitude Determination and Control Systems of the components to be connected. At small scales, most space structure assembly experiments in the literature include an original ConOps that includes an astronaut on an Extra Vehicular Activity (EVA) manipulating parts of the system, with tolerances necessarily befitting human dexterity with EVA gloves. This relationship between the design parameters of fastener systems and the control parameters of intended actuation mechanisms is also studied in modular reconfigurable robotics. Like on-orbit coupling mechanisms, the state of the art in reconfigurable robotics transitioned from gendered designs to androgynous fasteners. It is widely recognized that the adaptability and robustness of a robot design relies on high misalignment tolerance in the coupling interfaces. Recent efforts to apply robotics and automation to structural systems for aerospace applications are focused on high performance structural systems with relatively simple robots. This requires fastener mechanisms to employ design principles similar to the IBDM in order to relax the positioning requirements of the assembly robots. Unlike self-reconfiguring modular robotics, the structural connection in discrete lattice materials has high structural efficiency requirements, i.e. the stiffness and loading capacity per given mass. For space applications, the Automated Reconfigurable Mission Adaptive Digital Assembly Systems (ARMADAS) robots must construct a structure that is competitive with current state of the art lightweight structures. For this reason, the connection between building-block lattice elements cannot afford self-actuation due to the mass of the associated mechanisms. Instead, the fastening actuation is designed to be provided by the assembling robots. The mass of the fastening mechanism between building blocks must be minimized, since any nonstructural mass has a parasitic effect on specific properties like modulus and strength, but must maintain geometric features to make robotic fastening reliable with large misalignment tolerances. Because this application calls for actuation that is moved between fasteners, geometric features must ensure not only alignment between fasteners and building-blocks, but also alignment between the fasteners and the robotic driver providing fastener actuation.

Conventional or traditional male-female fasteners are available and include bayonet connectors, shear pins (inserted orthogonal to the net tensile loading directions), press and interference fit connectors, as well as conventional nuts and bolts. However, one significant disadvantage of these conventional fasteners when used to attempt structural connections between building-blocks of a structural system is the requirement for a particular orientation of the building-blocks. Changing or adjusting the orientation of the building blocks to accommodate a fastener is not always feasible and may be impossible in such applications. Another disadvantage of these conventional or traditional fasteners is the complexity in using these fasteners in a captive position in the building blocks that are to be structurally connected together.

What is needed is an androgynous fastener that provides the desired performance required for robotic assembly of structural systems comprising building-block lattice elements and also minimizes or eliminates the problems and disadvantages associated with conventional or traditional fasteners.

SUMMARY OF THE INVENTION

Embodiments of an androgynous fastener for autonomous robotic assembly of high performance structures are disclosed herein. The androgynous fastener is configured for autonomous robotic assembly of building block-based lattice structural components. The androgynous fastener facilitates assembly through simple actuation with large driver-positioning tolerance requirements, while producing a reversible mechanical connection with high strength and stiffness per mass. The androgynous fastener may be used in high strength-to-weight ratio structural systems, such as discrete building block-based systems that may be reconfigured and/or scaled and which provide system lifecycle efficiency. The androgynous fastener is lightweight and can be robotically installed into a structural system. The androgynous fastener is capable of resisting the tensile and shear forces upon loading of the lattice structure system thereby ensuring that the struts of the lattice structure system govern the mechanical behavior of the system. The integration of the androgynous fasteners into a high performance, robotically managed, structural system reduces launch energy requirements, enables higher mission adaptivity and decreases system life-cycle costs.

The androgynous fastener disclosed herein eliminates building-block orientation requirements and allows for assembly in all orthogonal build directions. The androgynous fastener is configured so that it may be captive in the building-block structural elements thereby minimizing the logistical complexity of needing to carry additional fasteners for assembly. The androgynous fastener provides a mechanically reversible connection to allow reconfiguration. The androgynous fastener also allows ease of robotic activation with low activation force and high holding strength, as well as low robotic motion complexity (i.e., low degrees of freedom with a low number of states being desired).

In some embodiments, the androgynous fastener comprises a head having a first side portion having a plurality of teeth for engaging a primary tool for maneuvering the androgynous fastener. The head further comprises an opposite second side portion. A conical frustum structure extends from and is contiguous with the opposite second side portion of the head. The conical frustum structure has an angle $\theta_1$ and a slanted length. The conical frustum structure has a pair of diametrically opposed exterior surfaces and a central axis that is coincident with a central axis of the androgynous fastener. The conical frustum structure has a first plurality of threads thereon that extend along the slanted length and are adjacent to one of the exterior surfaces. The conical frustum structure has a second plurality of threads thereon that are diametrically opposed to the first plurality of threads and extend along the slanted length. The second plurality of threads is adjacent to the other exterior surface of the conical frustum structure. The androgynous fastener further comprises a pair of diametrically opposed arms extending from the opposite second side portion of the head. Each arm is contiguous with the conical frustum structure and adjacent to a corresponding one of the first and second plurality of threads. Each arm has an exterior portion and an interior portion. The interior portions of the arms face each other. Each interior portion comprises a plurality of arm threads and is configured so that the plurality of arm threads taper at a thread taper angle $\theta_2$.

In some embodiments, an androgynous fastener comprises a substantially circular head having a first side portion having a plurality of teeth for engaging a primary tool for maneuvering the androgynous fastener. The substantially circular head further comprising an opposite second side portion. The head further comprises a recessed portion and a wall portion contiguous with and extending about the recessed portion. The teeth are contiguous with the recessed portion and the wall portion. The wall portion is angulated with respect to the recessed portion by a degree of angulation such that the recessed portion and wall portion cooperate to form an alignment cone to facilitate alignment of the tool with the teeth. The androgynous fastener further comprises a conical frustum structure extending from the opposite second side portion of the head. The conical frustum structure has an angle $\theta_1$ and a slanted length. The conical frustum structure has a pair of diametrically opposed exterior surfaces and a central axis that is coincident with a central axis of the androgynous fastener. The conical frustum structure has a first plurality of threads thereon which extend along the slanted length and are adjacent to one of the exterior surfaces of the conical frustum structure. The conical frustum structure has a second plurality of threads thereon that are diametrically opposed to the first plurality of threads and which extend along the slanted length. The second plurality of threads is adjacent to the other exterior surface of the conical frustum structure. The androgynous fastener further comprises a first arm extending from the opposite second side portion of the head. The first arm being contiguous with the conical frustum structure and adjacent to the first plurality of threads. The first arm has an exterior portion and an interior portion. The interior portion comprises a plurality of first arm threads. The interior portion of the first arm is configured so that the plurality of first arm threads taper at a thread taper angle $\theta_2$, wherein the thread taper angle $\theta_2$ is a complementary angle of angle $\theta_1$ of the conical frustum structure. The androgynous fastener further comprises a second arm extending from the opposite second side portion of the head and diametrically opposed to the first arm. The second arm is contiguous with the conical frustum structure and adjacent to the second plurality of threads. The second arm has an exterior portion and an interior portion that faces the interior portion of the first arm. The interior portion of the second arm comprises a plurality of second arm threads. The interior portion of the second arm is configured so that the plurality of second arm threads taper at the thread taper angle $\theta_2$.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

FIG. 6 is a table of exemplary fastener parameter and performance metric values;

DETAILED DESCRIPTION OF THE INVENTION

The present invention may be understood more readily by reference to the following detailed description taken in connection with the accompanying figures and examples, which form part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus. Also, as used in the specification including the appended claims, the singular forms "a", "an" and "the"

include the plural. Any numerical parameters set forth in the specification and attached claims are approximations (for example, by using the term "about") that may vary depending upon the desired properties sought to be obtained by the present invention. All ranges of numerical values are inclusive.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "embodiment" in various places in the specification are not necessarily all referring to the same embodiment.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

As used herein, terms such as "vertical", "horizontal", "top", "bottom", "upper", "lower", "middle", "above", "below" and the like are used for convenience in identifying relative locations of various components and surfaces relative to one another in reference to the drawings and are not intended to be limiting in any way.

Figure 2:
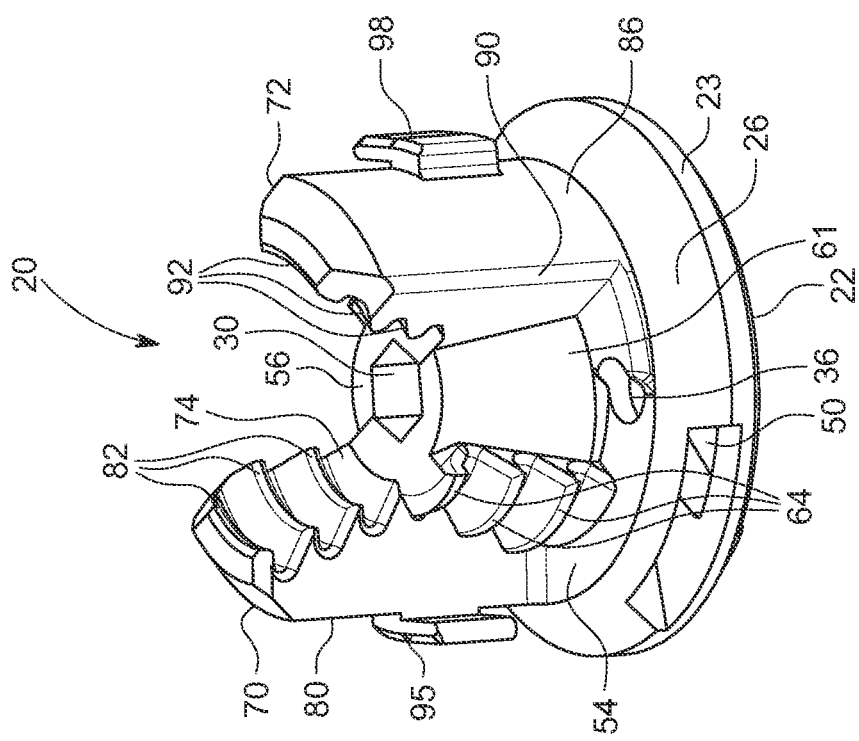
FIG. 2 is a bottom perspective view of the androgynous fastener.
Figure 1:
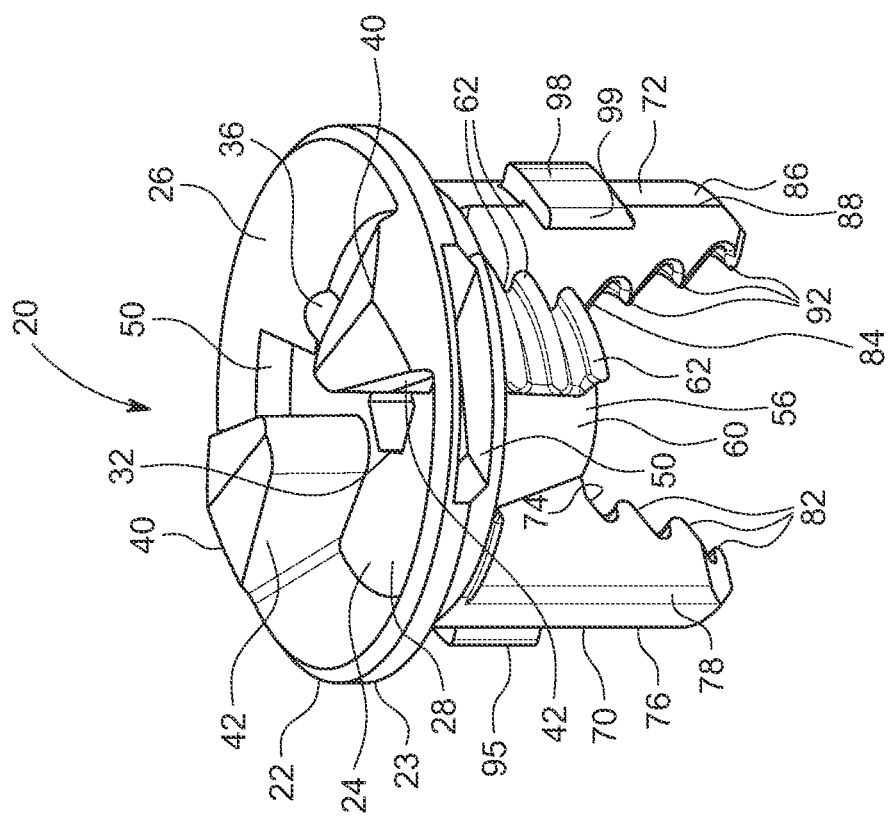
FIG. 1 is a perspective view of the androgynous fastener in accordance with an exemplary embodiment.
Figure 7:
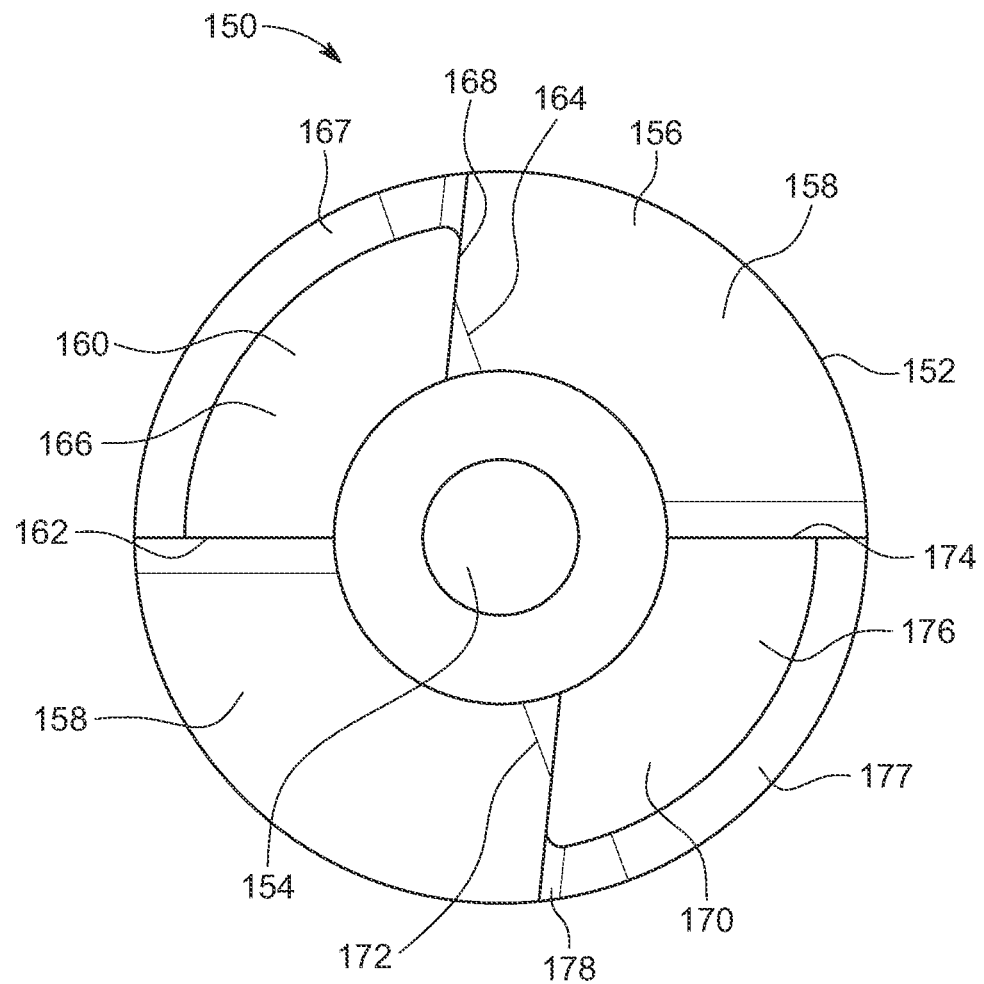
FIG. 7 is a top view of a driver bit configured to engage the androgynous fastener.
Figure 8:
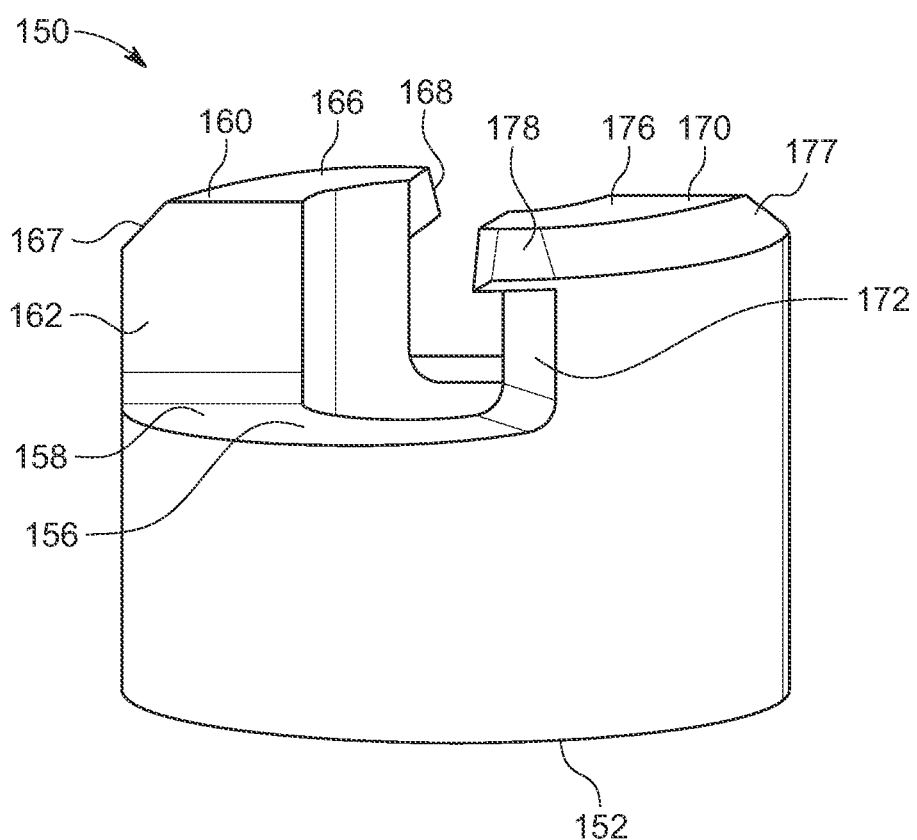
FIG. 8 is a perspective view of the driver bit.

Referring to FIGS. 1-2, there is shown androgynous fastener 20 in accordance with an exemplary embodiment. Androgynous fastener 20 meets strength requirements and structural requirements associated with operational axial tensile and shear loads and loads arising during torquing and installation. Androgynous fastener 20 meets these strength and structural requirements while minimizing mass. Androgynous fastener 20 facilitates robotic assembly and allows successful fastener activation with the lowest required positioning precision of the robotic driver bit and the lowest driving torque for a given fastener strength Androgynous fastener 20 comprises head 22 that is configured for engagement with a robotic driver bit 150 which is shown in FIGS. 7 and 8 and discussed in the ensuing description. In operation, driver bit 150 rotates androgynous fastener 20 in order to connect it to another identical androgynous fastener 20 so as to form a mechanical coupling or mechanical connection. Head 22 is configured to efficiently transfer torque from robotic drive bit 150 to androgynous fastener 20. Head 22 has a substantially circular shape and has perimetrical edge 23, recessed portion 24 and wall portion 26. Wall portion 26 extends about recessed portion 24. Recessed portion 24 has a substantially flat portion 28. Wall portion 26 is angulated with respect to recessed portion 24 by a predetermined degree of angulation. The geometrical characteristics and configuration of head 22 cooperate to facilitate radial alignment of the robotic drive bit 150 with head 22. Specifically, angulated wall portion 26 provides a basic alignment feature in the form of a cone, which is referred to herein as the "alignment cone". The angle of the alignment cone is determined by the degree of angulation of wall portion 26. In some embodiments, the degree of angulation of wall portion 26 is maximized to about 45° in order to allow a greater radial tolerance.

Referring to FIGS. 1 and 2, head 22 includes bore 30 that has opening 32 which is centrally located in recessed portion 24. Bore 30 extends along the central axis 34 of androgynous fastener 20. In an exemplary embodiment, bore 30 is substantially hex-shaped. In other embodiments, bore 30 is configured to have other shapes. Bore 30 provides several functions. First, bore 30 reduces the overall weight of androgynous fastener 20 since the material that would have been in the space of bore 30 would have been subjected to only a minimal load. Second, bore 30 is configured to receive a secondary tool (e.g. driver bit) that is part of a robotic end effector and thus provides a secondary means of rotating androgynous fastener 20 in order to fasten it to another identical androgynous fastener 20. Head 22 further includes a pair of openings 36 in substantially flat portion 28 of recessed portion 24. In an exemplary embodiment, openings are diametrically opposed to each other, wherein opening 32 of bore 30 is between openings 36. Openings 36 provide multiple functions. First, openings 36 provide a means for confirming that two androgynous fasteners 20 are fully engaged to form a complete mechanical coupling. Specifically, when both androgynous fasteners 20 are fully connected together to form a mechanical coupling, each opening 36 of one androgynous fastener 20 is aligned with a corresponding opening 36 in the other androgynous fastener 20. Such a configuration allows use of an automated line-of-sight sensor to verify that openings 36 of one androgynous fastener 20 are aligned with corresponding opening 36 in the other androgynous fastener 20. Another function of openings 36 is to provide the option of temporarily locking a pair of androgynous fasteners 20 together when these androgynous fasteners are in the fully engaged position to form a mechanical coupling. Specifically, pins or similar devices may be inserted through openings 36 of both androgynous fasteners 20 so that both androgynous fasteners are unable to back out and disengage. The pins may be removed in order to unfasten and release the androgynous fasteners 20.

Figure 3:
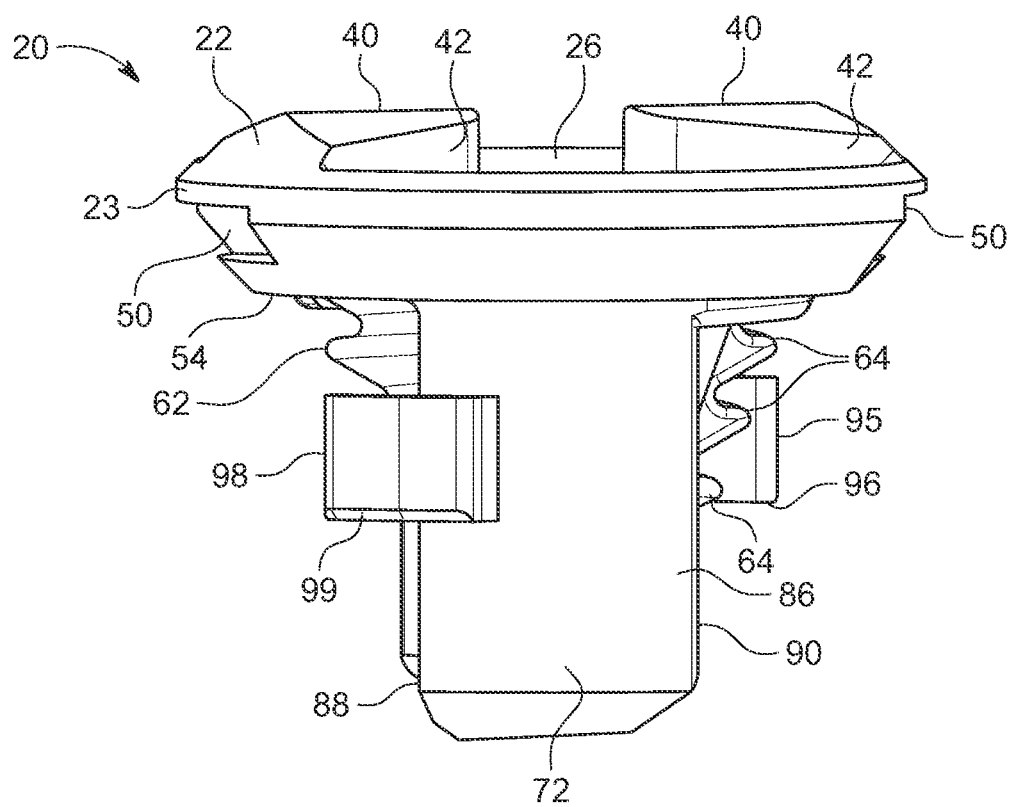
FIG. 3 is a side elevational view of the androgynous fastener.
Figure 5A:
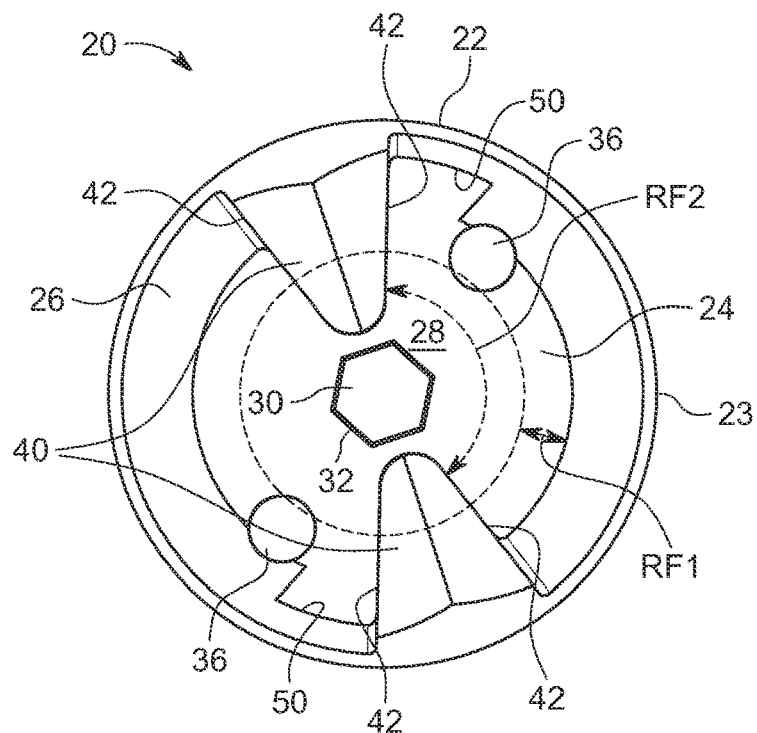
FIG. 5A is a top view of the androgynous fastener
Figure 5B:
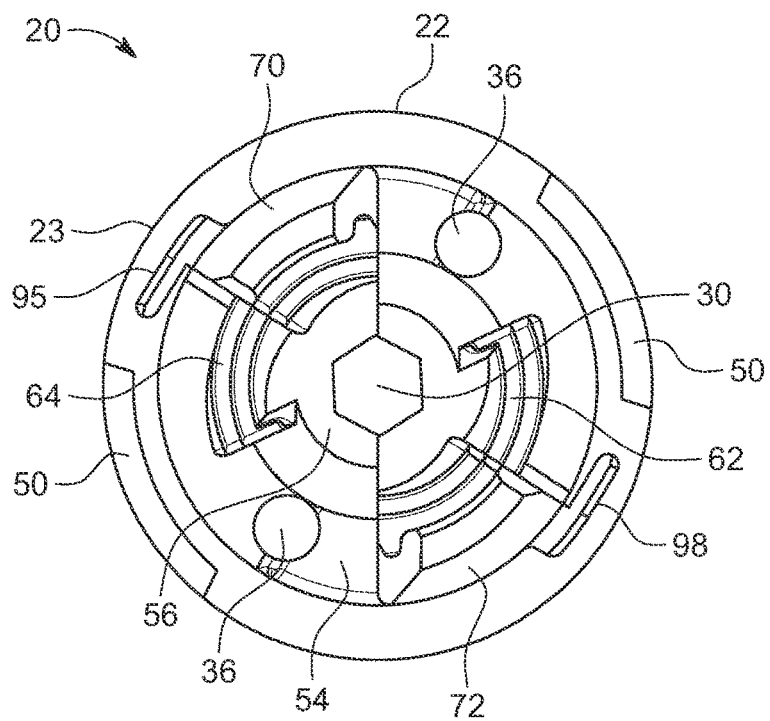
FIG. 5B is a bottom view of the androgynous fastener.

Referring to FIGS. 1, 3 and 5A, head 22 further comprises a plurality of teeth 40 that are joined or attached to recessed portion 24 and angulated wall portion 26. In an exemplary embodiment, the plurality of teeth 40 comprises two teeth. However, in other embodiments, there may be more than two teeth 40. In an exemplary embodiment, there are two diametrically opposed teeth 40. Opening 32 of bore 30 is between teeth 40. Teeth 40 are configured to be engaged by robotic driver bit 150 shown in FIGS. 7 and 8. Specifically, each tooth 40 has driving surfaces 42 that are configured to be engaged by robotic driver bit 150. The "draft angle" of each tooth 40 is the angle between driving surface 42 and the plane of head 22. Specifically, the draft angle may be measured between driving surface 42 and substantially flat portion 28 of recessed portion 24. The draft angle depends upon the axial force from robotic driver bit 150 and the friction between the robotic driver bit 150 and teeth 40. The friction between robotic driver bit 150 and the teeth 40 depends upon the particular material from which the androgynous fastener 20 is fabricated. The draft angle is chosen to maximize the allowable positional tolerances. It has been found that a draft angle greater than 90° may cause the robotic driver to "cam out" during fastening, but a draft angle less than or equal to 90° reduces this effect and facilitates engagement of robotic driver bit 150 with head 22. Therefore, in an exemplary embodiment, the draft angle is 90° so as to simplify control of robotic drive bit 150 and eliminate any additional steps for engagement and disengagement. Referring to FIG. 5A, the diametrically opposed teeth 40 maximize the spacing between teeth 40 so as to provide greater rotational tolerances for driver bit engagement. As used herein, "rotational tolerance" refers to the maximum rotational angle offset that allows androgynous fastener 20 and driver bit 150 to engage fully when axial force is applied. The "driver fit" is referred to as the tolerance between the fastener and the driver bit features and may be decomposed into the radial fit and the rotational fit. The radial fit is indicated by the notation RF1 and the rotational fit is indicated by the notation RF2. In an exemplary embodiment, the radial fit RF1 has a spacing of 3.0 mm. The rotational fit RF2 is minimized to allow for a large error in the rotational position of driver bit 150. In an exemplary embodiment, the rotational fit RF2 is about 50.4°. The driver azimuth angle is maximized so as to allow for the largest tooth height possible which does not cause any interference when the androgynous fastener 20 is in the unengaged captive position. As used herein, "driver azimuth angle tolerance" refers to the maximum offset angle of driver bit 150 from the orthogonal position in which driver bit 150 and androgynous fastener 20 are still engaged when rotating. The particular structure of head 22 maximizes the driver azimuth angle tolerance thereby allowing relaxation of the positioning requirements of robotic driver bit 150. In an exemplary embodiment, the driver azimuth angle tolerance is about 16.3°.

Referring to FIGS. 7 and 8, there is shown an exemplary embodiment of robotic driver bit 150 that may be used to rotate androgynous fastener 20 in order to connect the androgynous fastener 20 to another identical androgynous fastener to form a mechanical coupling. Robotic driver bit 150 also is configured to pull androgynous fastener 20 in a reverse axial direction in order to disassemble the mechanical coupling. Robotic driver bit 150 comprises base portion 152 having a central bore 154 for receiving a rotatable shaft (not shown) of a robotic end effector (not shown). Robotic driver bit 150 includes head engagement portion 156 that is contiguous with base portion 152. Head engagement portion 156 is configured to engage head 22 of androgynous fastener 20 and comprises surface 158 and tooth engaging structure 160 for engaging one of teeth 40. Tooth engagement structure 160 comprises sides 162 and 164 which are substantially perpendicular to surface 158 and configured to contact driving surfaces 42 of teeth 40. Tooth engagement structure 160 includes top portion side 166 which has beveled portion 167. The angle of beveled portion 167 is configured to substantially match the angle of angulation of wall portion 26 of head 22. Tooth engagement structure 160 includes overhanging portion 168, the purpose of which is discussed in the ensuing description. Similarly, head engagement portion 156 further comprises tooth engagement structure 170. Tooth engagement structure 170 comprises sides 172 and 174 which are substantially perpendicular to surface 158 and configured to contact driving surfaces 42 of teeth 40. Tooth engagement structure 170 includes top portion 176 and beveled portion 177. The angle of beveled portion 177 is configured to substantially match the angle of angulation of wall portion 26 of head 22. Tooth engagement structure 170 includes overhanging portion 178, the purpose of which is discussed in the ensuing description.

Referring to FIGS. 1-4 and 5A, head 22 further includes slot-like openings 50 in perimetrical edge 23 of head 22. In an exemplary embodiment, slot-like openings 50 are diametrically opposed to each other. Each slot-like opening 50 extends through wall portion 26 and also under a corresponding one of teeth 40. Slot-like openings 50 allow driver bit 150 to disassemble a mechanically coupling formed by a pair of androgynous fasteners 20. Each slot-like opening 50 creates a pocket in which a corresponding portion of driver bit 150 is positioned during disassembly of the mechanically coupling. Specifically, each overhanging portion 168 and 178 of driver bit 150 is configured to fit into a corresponding slot-like opening 50. Once driver bit 150 rotates androgynous fasteners 20 to the open position (counter-clockwise), the driver bit 150 is pulled backward in the axial direction. Since overhanging portions 168 and 178 are positioned within slot-like openings 50, the movement of driver bit 150 backward in the axial direction pulls androgynous fasteners 20 apart along the axial direction thereby disengaging androgynous fasteners 20 from each other. The extension of slot-like openings 50 through perimetrical edge 23 of head 22 also facilitates fabrication of androgynous fastener 20 by injection molding.

As shown in FIGS. 1, 2, 4 and 5B, head 22 further includes opposite second side portion 54 and centrally located structure 56 contiguous with and extending from opposite second side portion 54. Centrally located structure 56 has the geometric shape of a modified right circular cone wherein with the portion of the cone having the vertex is cut off so as to form a frustum or conical frustum. The angle $\theta_1$ of the conical frustum is the same as the angle of the unmodified right circular cone. In an exemplary embodiment, the $\theta_1$ is twenty degrees (20°) (. Centrally located structure 56 is referred to herein "conical frustum structure 56". Central axis 58 of conical frustum structure 56 is coincident with the central axis 34 of androgynous fastener 20. Bore 30 longitudinally extends through conical frustum 56 and the longitudinally extending axis of bore 30 is coincident with central axis 58 of conical frustum structure 56. Conical frustum structure 56 has a slanted length and a pair of separate exterior surfaces 60 and 61. In an exemplary embodiment, exterior surfaces 60 and 61 are diametrically opposed to each other. Conical frustum structure 56 has a first plurality of threads 62 thereon which extend along the slanted length and are adjacent to exterior surface 60. Conical frustum 56 has a second plurality of threads 64 thereon that are adjacent to exterior surface 61. In some embodiments, threads 62 and 64 are joined or attached to conical frustum structure 56 and in other embodiments, threads 62 and threads 64 are integral with conical frustum structure 56. In an exemplary embodiment, the first plurality of threads 62 and the second plurality of threads 64 are diametrically opposed. In an exemplary embodiment, each thread 62 and 64 is configured as a saw tooth buttress style thread. It has been found that the saw tooth buttress shape of the threads yields less friction than other thread shapes and requires relatively less torque to engage and thus facilitates robotic actuation. Another desirable effect of a saw tooth buttress thread is that for high and unidirectional loads, the face of the thread, which is bearing the load, is perpendicular to the load direction. Each plurality of threads 62 and 64 has a predetermined number of threads and each thread has predetermined thread angle. In an exemplary embodiment, the predetermined number of threads is three (3) and the predetermined thread angle is thirty degrees (30°). It has been found that a thread angle of about thirty degrees (30°) allows for a higher surface area of contact.

Referring to FIGS. 1-4 and 5B, androgynous fastener 20 further comprise extending arms 70 and 72 that are joined or attached to conical frustum structure 56. In some embodiments, extending arms 70 and 72 are integral with conical frustum structure 56. In an exemplary embodiment, extending arms 70 and 72 are diametrically opposed to each other. Extending arm 70 comprises interior portion 74, exterior portion 76 and lengthwise edges 78 and 80. Interior portion 74 is configured to have a plurality of threads 82 thereon. Similarly, extending arm 72 comprises interior portion 84, exterior portion 86 and lengthwise edges 88 and 90. Interior portion 84 is configured to have a plurality of threads 92 thereon. As shown in FIG. 2, interior portions 74 and 84 face each other and have the same number of threads. In an exemplary embodiment, interior portions 74 and 84 have three (3) threads 82 and 92, respectively. In an exemplary embodiment, each thread 82 and 92 is configured as a saw tooth buttress style thread. Each thread 82 and 92 is configured to have a predetermined thread angle $\theta_3$. As used herein, "thread angle" refers to the angle $\theta_3$ between adjacent thread surfaces. In an exemplary embodiment, the thread angle $\theta_3$ is about thirty degrees (30°). Threads 82 and 92 are configured to have a predetermined pitch. As used herein, "pitch" of the threads refers to the axial distance D1 (see FIG. 4) between the crests of adjacent threads. In an exemplary embodiment, the pitch is about 1.9 mm. When two androgynous fasteners 20 are engaged to form a mechanical coupling, the three threads of an arm (e.g. arm 70 or 72) of one androgynous fastener 20 engage the three threads (e.g. threads 62 or 64) on conical frustum structure 56 of the other androgynous fastener 20. This results in a total of six threads being engaged. It has been found that a thread pitch of 1.9 mm in conjunction with the engagement of six threads facilitates distribution of the load across more surfaces and prevents the possibility of shear failure on a single thread.

Referring to FIGS. 2, 3, 12 and 13, arm 70 further comprises tab member 95 that is attached to exterior portion 76. Tab member 95 has portion 96 that extends beyond lengthwise edge 78. Similarly, arm 72 further comprises tab member 98 that is attached to exterior portion 86. Tab member 98 has portion 99 that extends beyond lengthwise edge 88. The purpose of tab members 95 and 98 is discussed in the ensuing description.

Figure 4:
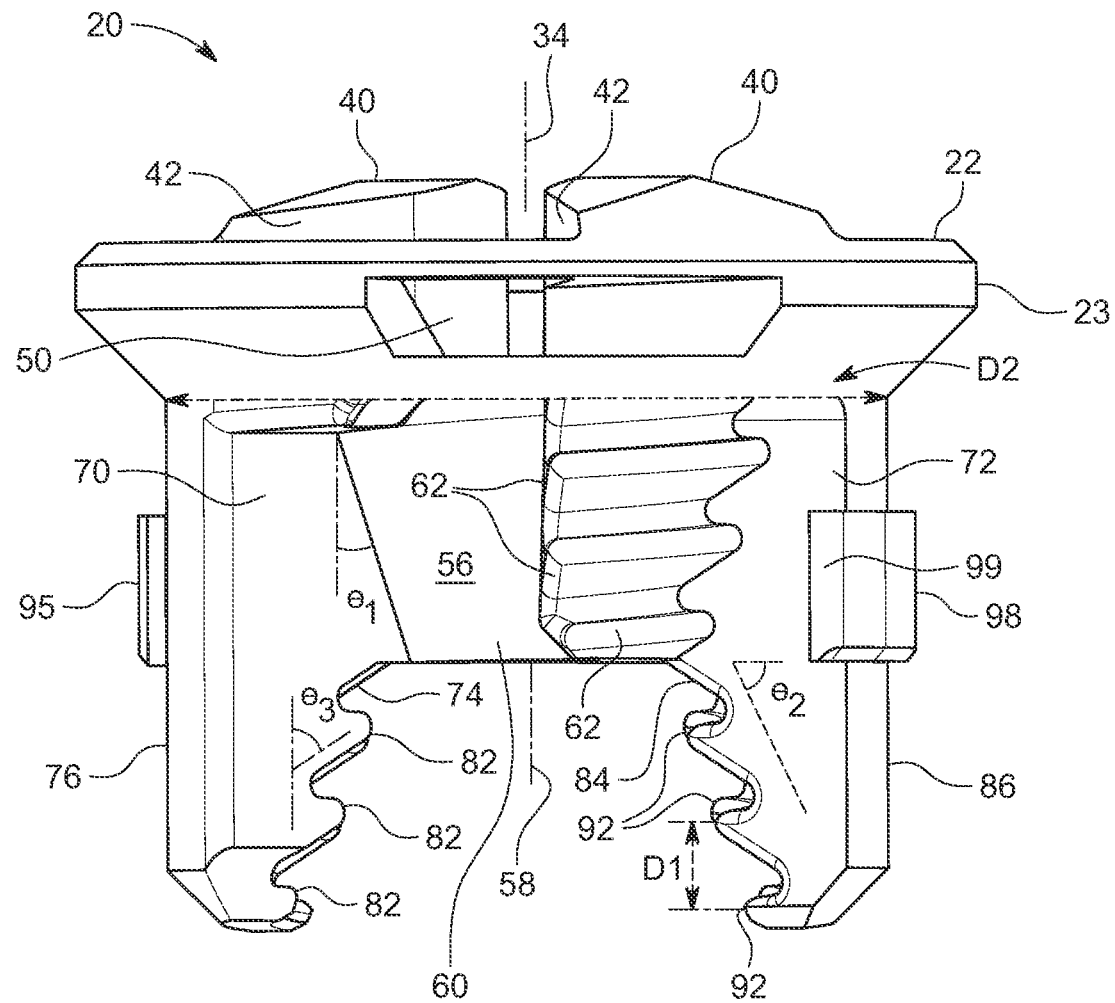
FIG. 4 is a front elevational view of the androgynous fastener.

As shown in FIGS. 2-4, interior portion 74 of arm section 70 is configured so that threads 82 are in a tapered arrangement based on a predetermined thread taper angle $\theta_2$. Similarly, interior portion 84 of arm section 72 is configured so that threads 92 are in a tapered arrangement based on the predetermined thread taper angle $\theta_2$. The thread taper angle $\theta_2$ is the complementary angle of angle $\theta_1$ of conical frustum structure 56. It has been found that the thread taper $\theta_2$ contributes to the minimization of the mass of androgynous fastener 20. In an exemplary embodiment, the thread taper $\theta_2$ is about seventy degrees (70°). As discussed in the foregoing description, in an exemplary embodiment, angle $\theta_1$ of conical frustum structure 56 is twenty degrees (20°). Since the exemplary thread taper angle $\theta_2$ is seventy degrees (70°), angles $\theta_1+\theta_2$ are complementary angles (i.e. $\theta_1+\theta_2=90°$). Referring to FIG. 4, the notation D2 refers to the external diameter which is the maximum diameter of the overall thread features. Androgynous fastener 20 is configured to have a maximum allowable external diameter D2 based on the unit-cell geometry so as to provide a maximum contact area. In an exemplary embodiment, the external diameter D2 is about 15.9 mm.

Referring to FIG. 6, there is shown Table I which provides a summary of the exemplary parameter values and performance metrics of androgynous fastener 20. It is to be understood that the parameter values and performance metrics shown in Table I pertain to an exemplary embodiment and that in other embodiments, these parameters and performance metrics may vary.

Figure 9:
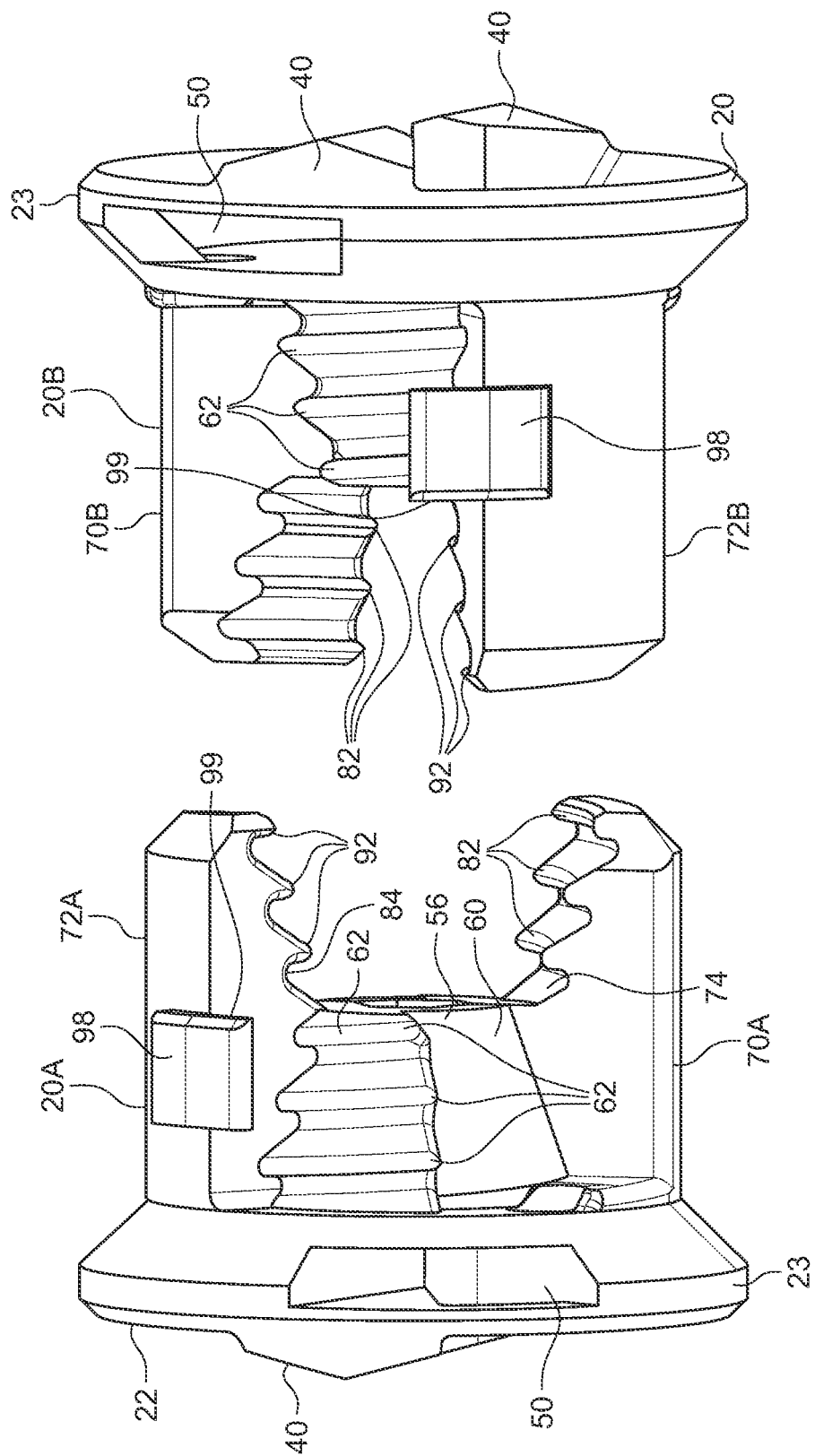
FIG. 9 is a perspective view illustrating the alignment of first and second identical androgynous fasteners prior to the androgynous fasteners being connected together to form a mechanical coupling.
Figure 10:
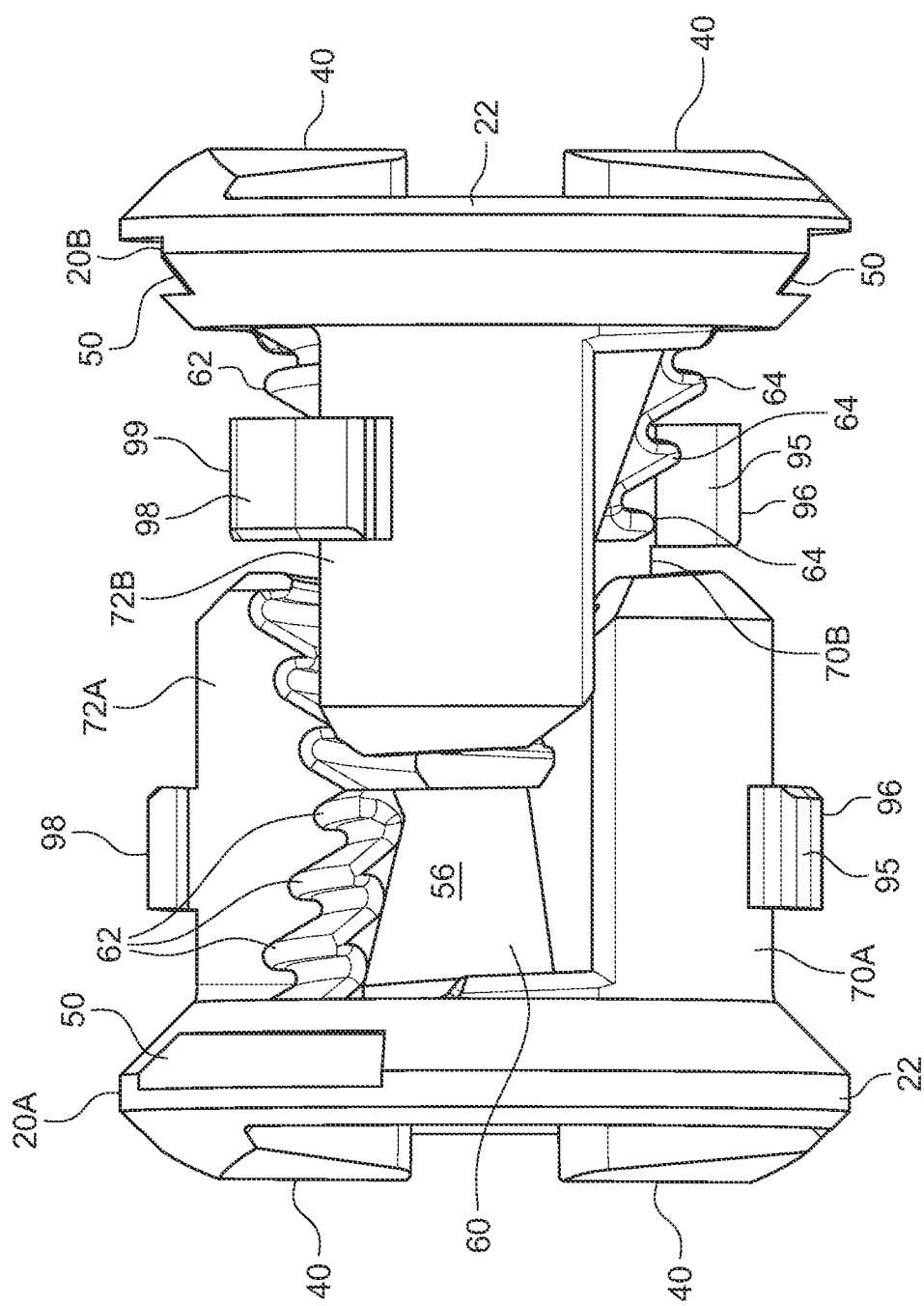
FIG. 10 is a perspective view showing the androgynous fasteners partially inserted into each other.
Figure 11:
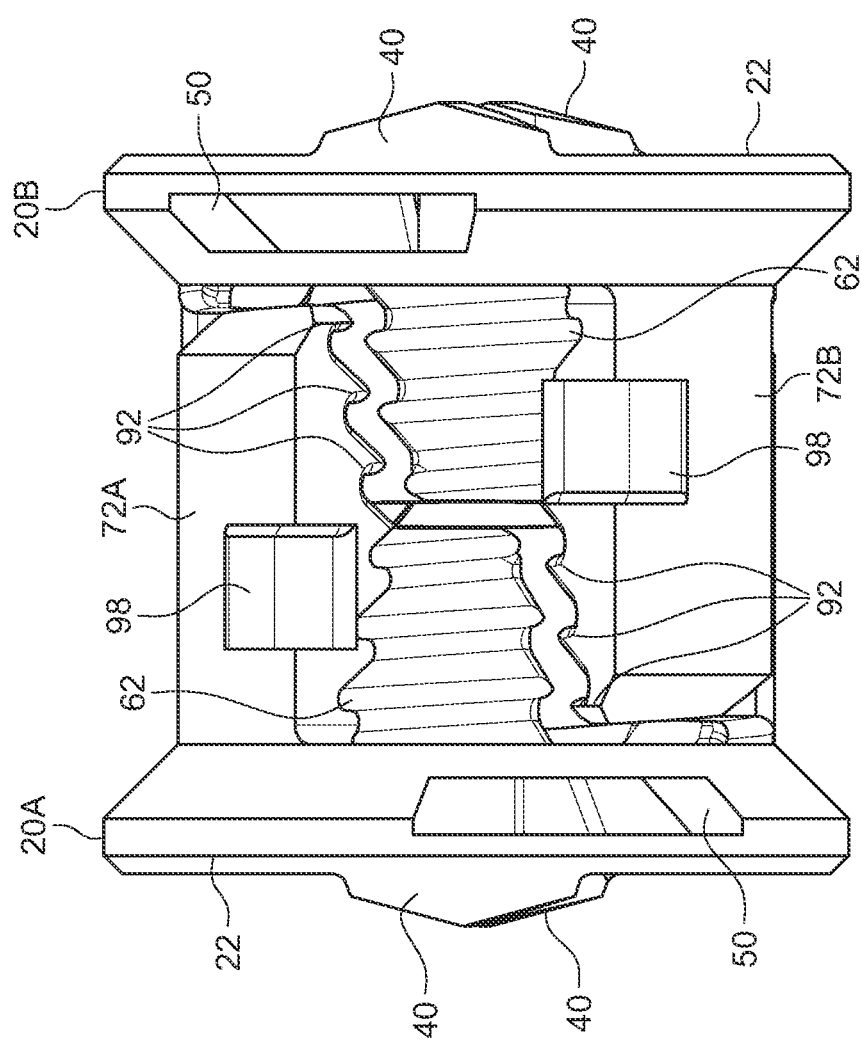
FIG. 11 is a perspective view showing the androgynous fasteners fully inserted into each other.

FIGS. 9-13 illustrate the process for connecting a pair of androgynous fasteners 20 together to form a mechanical coupling or mechanical connection. In order to facilitate understanding of this process, the androgynous fasteners 20 that are to be connected together are referred to as "fastener 20A" and "fastener 20B". The reference numbers "70A" and "72A" shall refer to the arms of fastener 20A, and the reference numbers "70B" and "72B" shall refer to the arms of fastener 20B. Furthermore, the threads on arms 70 and 72 of both fasteners 20A and 20B are referred to as "arm threads" and the threads on conical frustum structure 56 of both fasteners 20A and 20B are referred to as "frustum threads". FIG. 9 illustrates the alignment of androgynous fasteners 20A and 20B that is required to allow the fasteners 20A and 20B to be connected together to form a mechanical coupling. Each fastener 20A and 20B is positioned so that each of its arm sections is aligned with a corresponding one of exterior surfaces 60 and 61 of conical frustum structure 56 of the other fastener. As discussed in the forgoing description, exterior surfaces 60 and 61 are the portions of conical frustum structure 56 that do not have any threads thereon. For example, fastener 20A is positioned so that arm 70A is aligned with exterior surface 61 of fastener 20B and arm 72A is aligned with exterior surface 60 of fastener 20B. Next, as shown in FIG. 10, fasteners 20A and 20B are maneuvered in axial direction toward each other. This may be accomplished by a pair of robotic end effectors (not shown), each of which having driver bit 150. Referring to FIG. 11, fasteners 20A and 20B are fully inserted into each other such that arm 70A of fastener 20A faces exterior surface 61 of fastener 20B and arm section 72A of fastener 20A faces exterior surface 60 of fastener 20B, and arm 72B of fastener 20B faces exterior surface 60 of fastener 20A and arm 70B of fastener 20B faces exterior surface 61 of fastener 20A.

Figure 12:
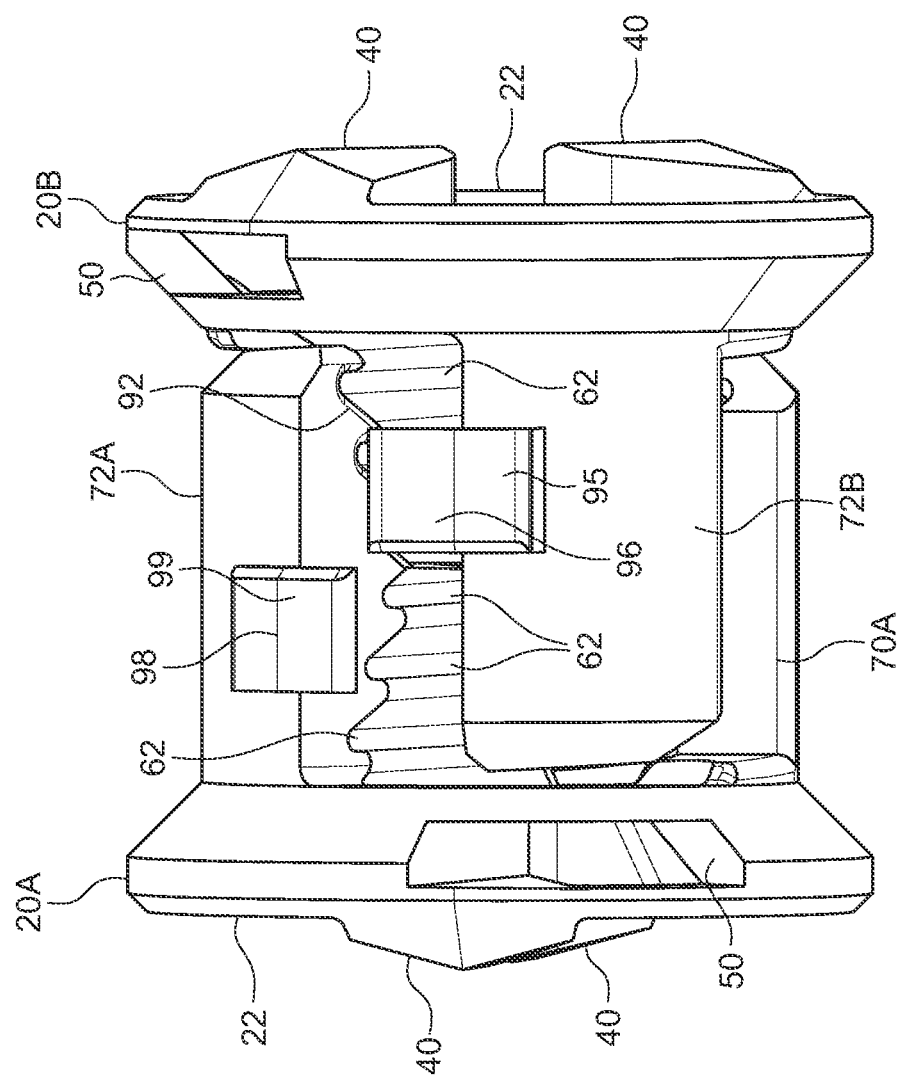
FIG. 12 is a perspective view showing the rotation of the androgynous fasteners so that the threads of one androgynous fastener engage the threads of the other androgynous fastener.
Figure 13:
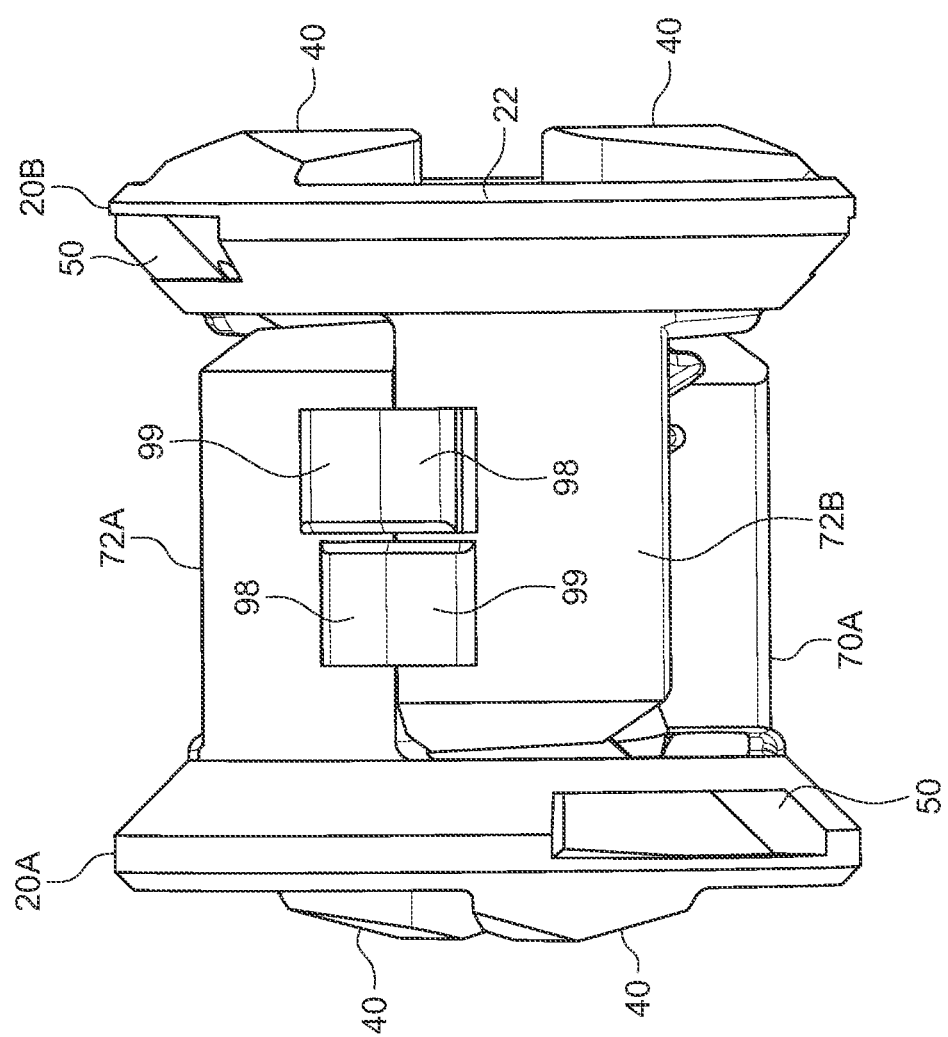
FIG. 13 is a perspective view showing the both androgynous fasteners having reached their maximum rotation and fully engaged so as to form a mechanical coupling.

Referring to FIG. 12, fastener 20A is rotated clockwise and fastener 20B is rotated counter-clockwise so that arm threads 82 of fastener 20A engage frustum threads 64 of fastener 20B and arm threads 92 of fastener 20A engage frustum threads 62 of fastener 20B, and arm threads 82 of fastener 20B engages frustum threads 64 of fastener 20A and arm threads 92 of fastener 20B engage frustum threads 62 of fastener 20A. Rotation of the fasteners 20A and 20B may be accomplished by the aforementioned robotic end effectors. Fasteners 20A and 20B are rotated until the arm threads of fastener 20A are fully engaged with the frustum threads of fastener 20B, and the arm threads of fastener 20B are fully engaged with the frustum threads of fastener 20A. This occurs when fasteners 20A and 20B reached the maximum rotation as shown in FIG. 13. As shown in FIG. 13, portion 99 of tab 98 on arm 72A extends over exterior portion 86 of arm 72B and portion 99 of tab 98 on arm 72B extends over exterior portion 86 of arm 72A thereby providing further integrity to the mechanical coupling formed by androgynous fasteners 20A and 20B.

The friction between the interlocking threads of fasteners 20A and 20B compresses the fasteners 20A and 20 together and through elastic deformation, provides a preloaded joint. The faces of the interlocking threads are perpendicular to the direction of the axial forces thereby providing a higher load capacity.

The particular material from which androgynous fastener 20 may be fabricated depends upon the particular application and the required performance. Suitable materials include, but are not limited to, reinforced plastics, PEEK, aluminum, copper, nickel, titanium and steel. Androgynous fastener 20 may be fabricated by any suitable fabrication processes, depending upon the material, the particular application and the required mechanical performance. Such suitable fabrication processes include, but are not limited to, 3D printing processes such as FDM, SLA, Polyjet, etc. Other suitable fabrication processes are CNC milling, casting and forging.

Efficient and high-integrity in-orbit assembly of space structures is critical for enabling missions that demand large scale infrastructure. Future space construction will require robots to operate autonomously in extreme environments. Utilizing conventional or traditional fastening components results in complex assembly requirements and intricate robotic systems with multiple points of failure. Androgynous fastener 20 eliminates the problems associated with conventional or traditional fasteners and achieves both the strength requirements and robotic assembly specifications required for the assembly of any space structure. Androgynous fastener 20 achieves a high load capacity and large engagement tolerances for robotic driver bits or similar tools.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An androgynous fastener, comprising:
    a head comprising a first side portion having a plurality of teeth for engaging a primary tool for maneuvering the androgynous fastener, the head further comprising an opposite second side portion;
    a conical frustum structure extending from the opposite second side portion of the head, wherein the conical frustum structure has an angle $\theta_1$ and a slanted length, the conical frustum structure having a pair of diametrically opposed exterior surfaces and a central axis that is coincident with a central axis of the androgynous fastener, the conical frustum structure having a first plurality of threads thereon that extend along the slanted length and are adjacent to one of the exterior surfaces, the conical frustum structure having a second plurality of threads therein that extend along the slanted length and are adjacent to the other of the exterior surfaces, the second plurality of threads being diametrically opposed to the first plurality of threads; and
    a pair of diametrically opposed arms extending from the opposite second side portion of the head, each arm being contiguous with the conical frustum structure and adjacent to a corresponding one of the first plurality of threads and the second plurality of threads, each arm having an exterior portion and an interior portion, wherein the interior portions of the arms face each other, each interior portion comprising a plurality of arm threads and being configured so that the plurality of arm threads taper at a thread taper angle $\theta_2$.

2. The androgynous fastener according to claim 1 wherein the angle $\theta_1$ of the conical frustum structure and the thread taper angle $\theta_2$ are complementary angles.

3. The androgynous fastener according to claim 1 wherein the plurality of teeth comprises a pair of diametrically opposed teeth.

4. The androgynous fastener according to claim 1 wherein the head is substantially circular in shape and the first side portion of the head comprises:
    a recessed portion; and
    a wall portion contiguous with and extending about the recessed portion;
    wherein the teeth are contiguous with the recessed portion and the wall portion; and
    wherein the wall portion is angulated with respect to the recessed portion by a degree of angulation such that the wall portion forms an alignment cone to facilitate alignment of the primary tool with the teeth.

5. The androgynous fastener according to claim 4 wherein the wall portion has a pair of diametrically opposed slots that extend through the wall portion, each slot being sized to receive a portion of the primary tool to enable the primary tool to withdraw the androgynous fastener in an axial direction so as to disengage the androgynous fastener from an identical androgynous fastener.

6. The androgynous fastener according to claim 4 wherein the recessed portion has at least one through-hole for alignment with a corresponding through-hole in the recessed portion of another identical androgynous fastener when both androgynous fasteners are fully engaged to form a mechanical coupling.

7. The androgynous fastener according to claim 1 wherein the head further comprises a bore centrally located in the first side portion, the bore extending along the central axis of the conical frustum structure and being configured for receiving a secondary tool for rotating the androgynous fastener.

8. The androgynous fastener according to claim 7 wherein the bore has a substantially hexagonal shape.

9. The androgynous fastener according to claim 1 wherein each arm has a pair of lengthwise edges and a tab member that is attached to the exterior portion of each arm, wherein the tab member has a portion that extends beyond a corresponding lengthwise edge of the arm.

10. An androgynous fastener, comprising:
    a substantially circular head having a first side portion having a plurality of teeth for engaging a primary tool for maneuvering the androgynous fastener, the head further comprising an opposite second side portion, the head further comprising a recessed portion and a wall portion contiguous with and extending about the recessed portion, wherein the teeth are contiguous with the recessed portion and the wall portion and wherein the wall portion is angulated with respect to the recessed portion by a degree of angulation such that the wall portion forms an alignment cone to facilitate alignment of the primary tool with the teeth;
    a conical frustum structure extending from the opposite second side portion of the head and having an angle $\theta_1$ and a slanted length, the conical frustum structure having a pair of diametrically opposed exterior surfaces and a central axis that is coincident with a central axis of the androgynous fastener, the conical frustum structure having a first plurality of threads thereon which extend along the slanted length and are adjacent to one of the exterior surfaces, the conical frustum structure having a second plurality of threads thereon that are diametrically opposed to the first plurality of threads, the second plurality of threads extending along the slanted length and being adjacent to the other of the exterior surfaces;
    a first arm extending from the opposite second side portion of the head, the first arm being contiguous with the conical frustum structure and adjacent to the first plurality of threads, the first arm having an exterior portion and an interior portion, wherein the interior portion comprises a plurality of first arm threads and wherein the interior portion of the first arm is configured so that the plurality of first arm threads taper at a thread taper angle $\theta_2$ which is a complementary angle of angle $\theta_1$ of the conical frustum structure; and a second arm extending from the opposite second side portion of the head and diametrically opposed to the first arm, the second arm being contiguous with the conical frustum structure and adjacent to the second plurality of threads, the second arm having an exterior portion and an interior portion that faces the interior portion of the first arm, wherein the interior portion of the second arm comprises a plurality of second arm threads and wherein the interior portion of the second arm is configured so that the plurality of second arm threads taper at the thread taper angle $\theta_2$.

11. The androgynous fastener according to claim 10 wherein plurality of teeth comprises two diametrically opposed teeth.

12. The androgynous fastener according to claim 10 wherein the wall portion of the head has a pair of diametrically opposed slots that extend through the wall portion, each slot being sized to receive a portion of the primary tool to enable the primary tool to the withdraw the androgynous fastener in an axial direction.

13. The androgynous fastener according to claim 10 wherein the recessed portion has at least one through-hole for alignment with a corresponding through-hole in the recessed portion of another identical androgynous fastener when both androgynous fasteners are fully engaged to form a mechanical coupling.

14. The androgynous fastener according to claim 10 wherein the head further comprises a bore having an opening centrally located in the first side portion, the bore extending along the central axis of the conical frustum structure and being configured for receiving a secondary tool for rotating the androgynous fastener.

15. The androgynous fastener according to claim 14 wherein the bore has a substantially hexagonal-shape.

16. The androgynous fastener according to claim 10:
wherein the first arm has a pair of lengthwise edges and includes a first tab member that is attached to the exterior portion of the first arm, wherein the first tab member has a portion that extends beyond one of the lengthwise edges of the first arm; and
wherein the second arm has a pair of lengthwise edges and includes a second tab member that is attached to the exterior portion of the second arm, wherein the second tab member has a portion that extends beyond one of the lengthwise edges of the second arm.

17. An androgynous fastener, comprising:
a substantially circular head having a first side portion having a plurality of teeth for engaging a primary tool and an opposite second side portion, the head further comprising a recessed portion and a wall portion contiguous with and extending about the recessed portion, wherein the teeth are contiguous with the recessed portion and the wall portion and wherein the wall portion is angulated with respect to the recessed portion by a degree of angulation such that the wall portion forms an alignment cone to facilitate alignment of the primary tool with the teeth;

a conical frustum structure extending from the opposite second side portion of the head and having an angle $\theta_1$ and a slanted length, the conical frustum structure having a pair of diametrically opposed exterior surfaces and a central axis that is coincident with a central axis of the androgynous fastener;

wherein the head includes comprises a bore having an opening centrally located in the first side portion, the bore extending along the central axis of the conical frustum structure and being configured for receiving a secondary tool for rotating the androgynous fastener;

wherein the conical frustum structure has a first plurality of threads thereon that extend along the slanted length and are adjacent to one of the exterior surfaces and wherein the conical frustum structure has a second plurality of threads thereon that extend along the slanted length and are adjacent to the other of the exterior surfaces, wherein the second plurality of threads are diametrically opposed to the first plurality of threads;

a first arm extending from the opposite second side portion of the head, the first arm being contiguous with the conical frustum structure and adjacent to the first plurality of threads, the first arm having an exterior portion and an interior portion, wherein the interior portion comprises a plurality of first arm threads and wherein the interior portion of the first arm is configured so that the plurality of first arm threads taper at a thread taper angle $\theta_2$; and a second arm extending from the opposite second side portion of the head and diametrically opposed to the first arm, the second arm being contiguous with the conical frustum structure and adjacent to the second plurality of threads, the second arm having an exterior portion and an interior portion facing the interior portion of the first arm, wherein the interior portion of the second arm comprises a plurality of second arm threads and wherein the interior portion of the second arm is configured so that the second arm threads taper at the thread taper angle $\theta_2$.

18. The androgynous fastener according to claim 17 wherein the angle $\theta_1$ of the conical frustum structure and the thread taper angle $\theta_2$ are complementary angles.

19. The androgynous fastener according to claim 17 wherein the wall portion of the head has a pair of diametrically opposed slots that extend through the wall portion, each slot being sized to receive a portion of the primary tool to enable the primary tool to move the androgynous fastener in an axial direction.

20. The androgynous fastener according to claim 17 wherein the recessed portion has at least one through-hole arranged for alignment with a corresponding through-hole in the recessed portion of another identical androgynous fastener when both androgynous fasteners are fully engaged to form a mechanical coupling.

* * * * *